R. Montgomery,
Horse Power.
N°3,988.   Patented Apr. 10, 1845.
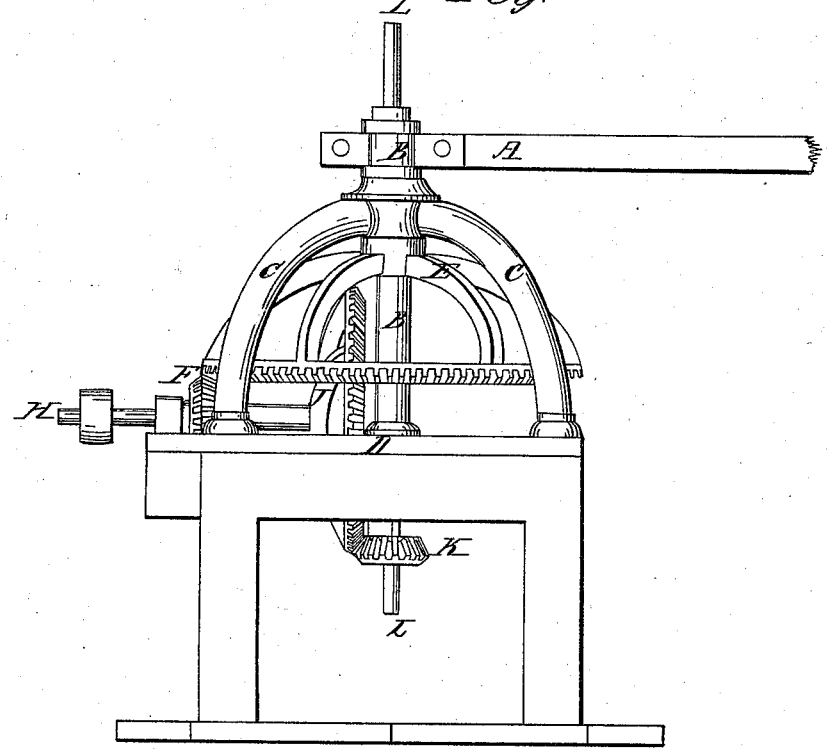
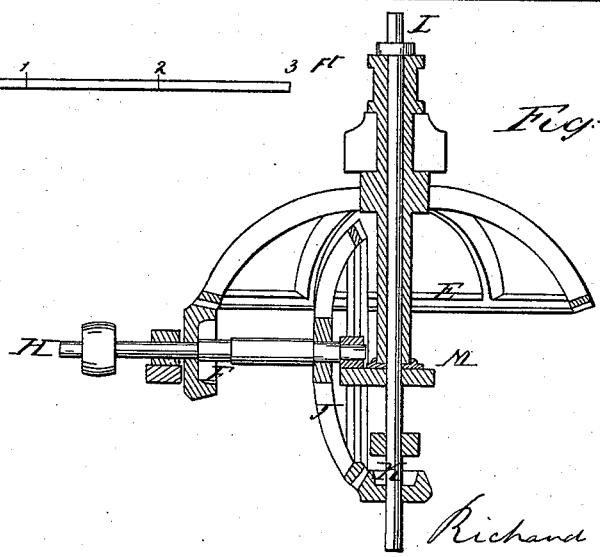
Witnesses
Inventor
Richard Montgomery

UNITED STATES PATENT OFFICE.

RICHARD MONTGOMERY, OF SANGERFIELD, NEW YORK.

HORSE-POWER FOR DRIVING MACHINERY.

Specification of Letters Patent No. 3,988, dated April 10, 1845.

*To all whom it may concern:*

Be it known that I, RICHARD MONTGOMERY, of Sangerfield, in the county of Oneida and State of New York, have invented a new and useful Improvement in the Construction of a Horse, Steam, or Water Power and in Its Application to Machinery, it being portable and its construction and combination such as to give great speed and occupy but little space, and that the following is a full and exact description.

The lever A, (Figure 1) is attached to the hollow shaft B, B, which is perpendicular and supported at the upper end by a brace stand C, C, resting upon a bed-plate D. The lower end of said shaft rests upon a step attached to the center of bed plate D. The main wheel E, which is bevel, works in a small bevel pinion F, attached to the horizontal shaft H, which runs in pillar blocks on the bed plate D. For the purpose of greater speed, upon the inner end of said shaft H, there is a vertical bevel wheel J, which runs very near the main shaft B, B. The arms of the main wheel E, are so curved as to admit the vertical wheel J, which runs into a bevel pinion K, on the upright shaft L, L, revolving in the main shaft B, B. The hollow shaft B, B, has a collar immediately under the lever A at B. The inner shaft L, L, rests and runs on a collar at the top of the hollow shaft B, B, and is supported by a hanger M, Fig. 2, which is attached to bed plate D, Fig. 1. Power can be had by attaching either to the upper or lower end of the shaft L, L, or if more power and less speed are required by attaching to the horizontal shaft H.

I am aware that bevel wheels have been made dishing or concave for the purpose of permitting other wheels to turn within their peripheries, and I am also aware that a combination of wheels has been made in which the shaft of the last wheel passes through the shaft of the main or master wheel, and therefore I do not claim these as of my invention, but What I do claim and desire to secure by Letters Patent, is, The arrangement of the bevel cog wheels with the shaft of the last wheel passing through the shaft of the main wheel, in combination with the dished form of the main or master wheel, by which arrangement in combination the whole is rendered more compact than by any other with which I am acquainted, all as herein described.

RICHARD MONTGOMERY.

Witnesses:
   A. S. NEWBERRY,
   S. D. CARPENTER.